(12) United States Patent
Raybould et al.

(10) Patent No.: US 6,670,050 B2
(45) Date of Patent: Dec. 30, 2003

(54) TITANIUM-BASED HEAT EXCHANGERS AND METHODS OF MANUFACTURE

(75) Inventors: Derek Raybould, Denville, NJ (US); Paul Chipko, Blairstown, NJ (US); Matthew J. Pohlman, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/874,564

(22) Filed: Jun. 5, 2001

(65) Prior Publication Data

US 2001/0054500 A1 Dec. 27, 2001

Related U.S. Application Data

(63) Continuation-in-part of application No. 08/865,905, filed on May 30, 1997, now abandoned.

(51) Int. Cl.[7] ........................ B32B 18/00; B32B 15/20; C23C 30/00; C25C 1/04
(52) U.S. Cl. ........................ 428/629; 428/633; 428/651; 428/655; 428/660; 148/240; 148/281; 148/528
(58) Field of Search ................................ 428/629, 651, 428/655, 633, 660; 165/166, 185, 905; 148/240, 281, 528

(56) References Cited

U.S. PATENT DOCUMENTS

| | | | | |
|---|---|---|---|---|
| 4,681,818 A | * | 7/1987 | Unnam et al. | 148/247 |
| 4,936,927 A | * | 6/1990 | Grunke et al. | 148/421 |
| 5,110,035 A | * | 5/1992 | Reynolds et al. | 228/183 |
| 5,267,605 A | * | 12/1993 | Doty et al. | 165/133 |
| 5,564,496 A | * | 10/1996 | Blum et al. | 165/133 |
| 5,585,136 A | * | 12/1996 | Barrow et al. | 427/2.24 |
| 5,673,436 A | * | 10/1997 | Piper | 2/160 |

FOREIGN PATENT DOCUMENTS

| | | |
|---|---|---|
| EP | 0 495 454 A2 | 7/1992 |
| EP | 0 518 590 | * 12/1992 |
| EP | 0 671 240 | * 9/1995 |
| GB | 2 252 981 | * 8/1992 |
| JP | 2-85694 | * 3/1990 |
| WO | WO 98/54531 | 12/1998 |

* cited by examiner

Primary Examiner—John J. Zimmerman
Assistant Examiner—Jason Savage
(74) Attorney, Agent, or Firm—Oral Caglar, Esq.

(57) ABSTRACT

Oxidation protection of a titanium heat exchanger is provided by a titanium aluminide or solgel coating. The coating protects bare titanium and brazed surfaces of the heat exchanger.

13 Claims, 4 Drawing Sheets

TITANIUM-BASED HEAT EXCHANGERS AND METHODS OF MANUFACTURE

REFERENCE TO CROSS-RELATED APPLICATION

This is a continuation-in-part of U.S. Ser. No. 08/865,905, filed on May 30, 1997, now abandoned.

BACKGROUND

The invention relates to heat exchangers. More specifically, the invention relates to oxidation protection of titanium-based heat exchangers.

Certain heat exchangers used in aircraft environmental control systems are exposed to temperatures exceeding 400° C. These heat exchangers are typically made of stainless steel, which can withstand the high temperatures.

It would be desirable to use titanium heat exchangers instead of stainless steel heat exchangers. Titanium and its alloys have a light weight and can provide a weight reduction of up to 40% over comparable stainless steel heat exchangers. The weight reduction results in better fuel efficiency and lower aircraft operating costs.

However, titanium is not used for high temperature heat exchanger applications because the titanium exhibits a propensity to rapidly oxidize, (over a couple of hours), at the required operating temperatures. Oxidation of titanium results in a reduction in ductility and then strength, and a deterioration in structural integrity. Repeated thermal cycling at temperatures between ambient temperature and around 400° C. (and higher) causes the titanium to crack. Cross contamination of fluids can occur and lead to life-threatening conditions.

DETAILED DESCRIPTION

Figure 1:
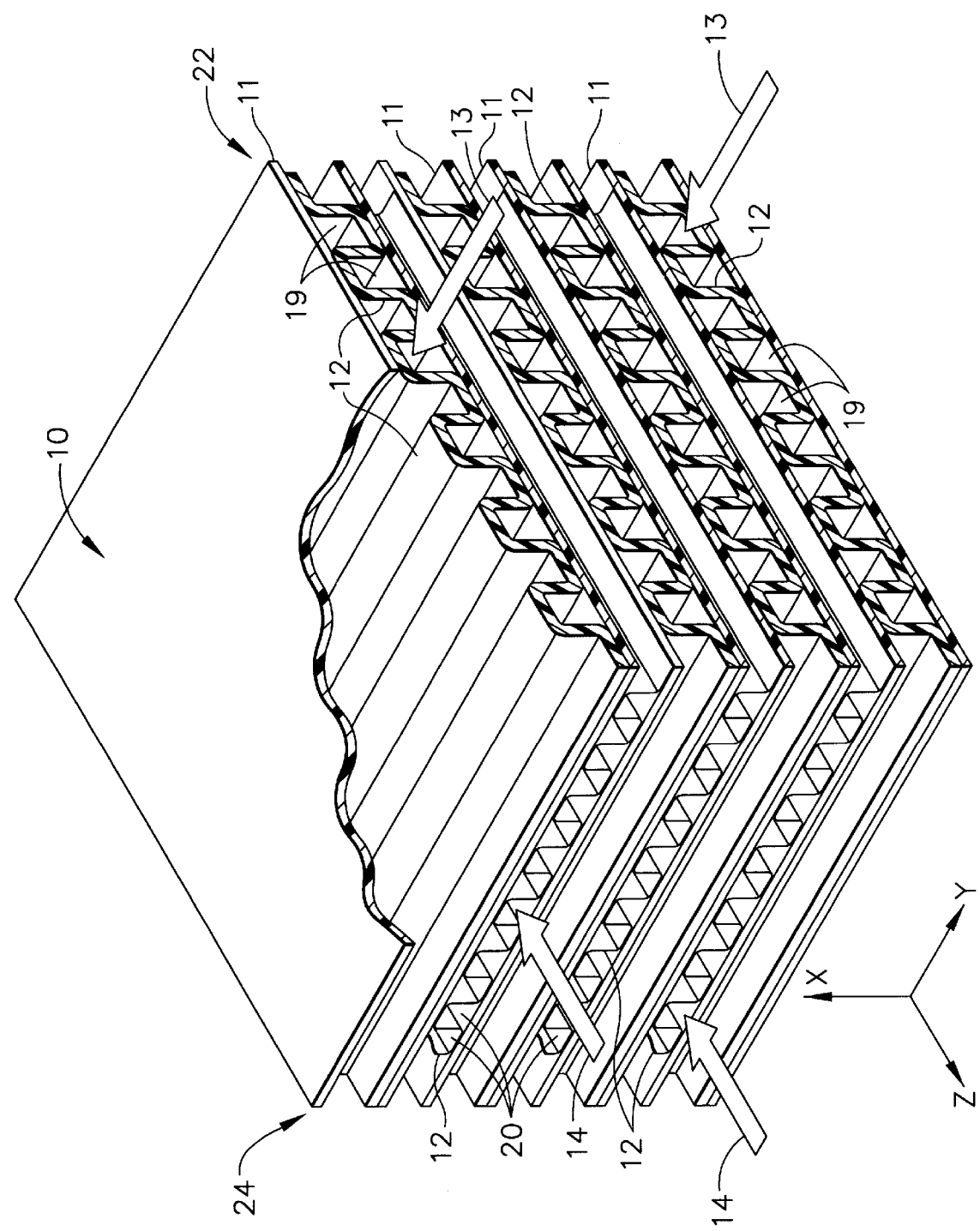
FIG. 1 is an illustration of a core of a titanium heat exchanger.

Reference is made to FIG. 1. A heat exchanger core 10 includes a plurality of flat parallel plates 11 that are separated by spacers or fins 12. The plates 11 and fins 12 define first and second fluid flow passageways 13 and 14. Dimensions of the passageways 13 and 14 are typically between about 0.5 mm and 2 mm square, and may be about 400 mm long. The passageways 13 and 14 may be designed to promote turbulence in the fluid flow in order to improve heat transfer by the avoidance of boundary layers. Although not shown as such, the passageways 13 and 14 of the heat exchanger core 10 may have wavy shapes or other complex shapes that create turbulence.

The plates 11 and fins 12 are made of a titanium-based metal. Making the heat exchanger core 10 of titanium offers a 40% weight saving over stainless steel or superalloys that are currently used. Because of its complex geometry the material used to make the heat exchanger must be formable into complex geometries, preferably at room temperature. Titanium, alpha, alpha-plus-beta and beta titanium alloys are preferred.

The fins 12 are bonded to the plates 11 by brazing. During fabrication, the plates 11 and fins 12 and brazing filler metal are stacked to form a stacked assembly. The stacked assembly is then heated to form a brazed and unified core 10. In addition to bonding the plates 11 to the fins 12, the braze maintains integrity of the fluid passageways 13 and 14. Most of the plates 11 and fins 12 are coated with the braze alloy. A large fraction of the surface of the heat exchanger core 10 is braze clad and therefore has a varying chemistry and surface finish.

Typical brazes for titanium and its alloys contain less than 50% titanium, with 20% being usual. Other typical metals in the braze are copper, silver, nickel and zirconium. Some titanium brazes contain no titanium (e.g., a braze including Ag 82% Pd 9% Ga 9%) and many only contain trace amounts of titanium (e.g., a braze including Ag 59% Cu 27.25% In 12.50% Ti 1.25%). Thus a range of alloys are used to braze titanium, and after brazing these alloys will have a composition ranging from that of the braze to that of the titanium alloy.

Manifolds and end plates (not shown) are typically welded to the heat exchanger core 10. The manifolds and end plates are typically not braze coated. Therefore, the manifolds and ends of the fins are usually bare titanium.

The completed heat exchanger has a range of surfaces. Some of these surfaces result from individual manufacturing processes such as casting and rolling. Other surfaces are brazed and welded. Some of these surfaces are inside the heat exchanger and, once formed, cannot be visually inspected or prepared for coating.

A protective coating is applied to exposed surfaces of the heat exchanger core 10, the manifolds and the end plates. The coating may be either a titanium aluminide coating or a solgel coating. The coatings and thermal cycles are compatible with the titanium alloy and also with the braze alloy. Protection of one, but not the other, would be of no benefit and separate coatings for each are not technically or economically desirable due to the complexity of the heat exchangers shape and the complex transitions from bare to braze clad titanium. Not only do the titanium aluminide and solgel coatings provide oxidation protection, but they are able to withstand the different thermal stresses due to thermal cycling set up by either titanium or braze clad titanium, because of their good bonding to the base titanium and braze, their high strength and because they are thin. The braze and titanium have different coefficients of thermal expansion so locally at the junction between braze clad and titanium the coating may be subject to high strains and stresses Moreover, the coatings maintain adequate strength and ductility in the titanium, which allows the heat exchanger to handle structural forces occurring in high temperature heat transfer applications. In an aircraft, for example, there are high pressures and temperature cycling and vibrations from the surrounding environment (e.g. the aircraft engine on which the heat exchanger is attached). The coatings do not reduce the thermal conductivity of the titanium and, therefore, do not reduce the heat exchanger efficiency.

Figure 2A:
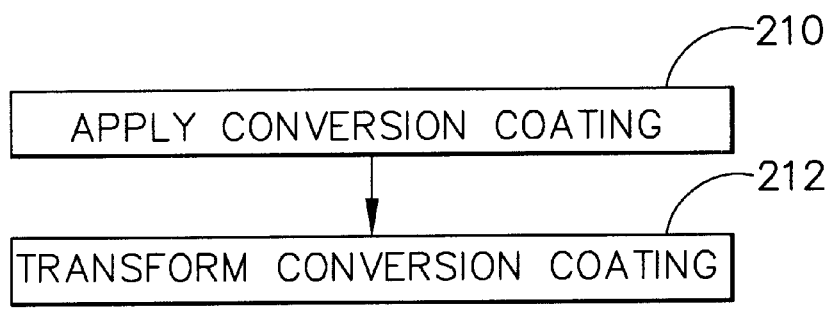
FIG. 2a is an illustration of a first method of applying a protective coating to the titanium heat exchanger.

Referring to FIG. 2a, an exemplary method of creating a titanium aluminide protective coating will now be described. An aluminum conversion coating is applied to the heat exchanger to ensure coverage of all of the exposed surfaces (block 210). The conversion coating may be applied by a mechanical process, such as roll bonding, or by physical vapor deposition (PVD) or low temperature chemical vapor deposition (LTCVD). Preferably the deposited conversion layer has thickness in the range of 0.5–40 microns.

The preferred technique, however, is applying the aluminum conversion coating as a gaseous phase at a temperature below which aluminum does not appreciably react with titanium or braze melts (about 500° C.). The gaseous deposition may be performed at temperatures below 300° C. An advantage of using gas as a carrier is that the gas flows throughout the heat exchanger at a low pressure and velocity. As a result, heat exchanger surfaces designed to create turbulent gas flow, surfaces at which have stagnant flow areas, and other hard-to-reach surfaces within the heat exchanger are all uniformly coated. Thus the gaseous deposition results in a conversion coating that is applied with a uniform thickness, even if the heat exchanger has a complex geometry.

The coated assembly is then heat treated (e.g., in a vacuum furnace) to activate the conversion coating and transform the aluminum into titanium aluminide with an alumina surface (block 212). Upon heat treatment, the aluminum oxidizes to form alumina and interacts with the titanium to form the titanium aluminide. The heating and cooling rates are controlled to avoid cracking the titanium aluminide. Cracking of the titanium aluminide coating is a particular concern, as it will result in oxidation of the titanium in the cracked area. As oxygen diffuses quickly in titanium, a single crack can result in the oxidation of a complex heat exchanger part.

The aluminum conversion layer may be transformed to titanium aluminide by heating at a slow controlled rate above 500° C. up to 750° C., followed by a short hold, and cooling at a controlled slow rate down to about 500° C. For example, heating may be at 100° C. per hour after 500° C. followed by a 30 minutes hold at 750° C. and then cooling will also be around 100° C. per hour down to 500° C.

Figure 3:
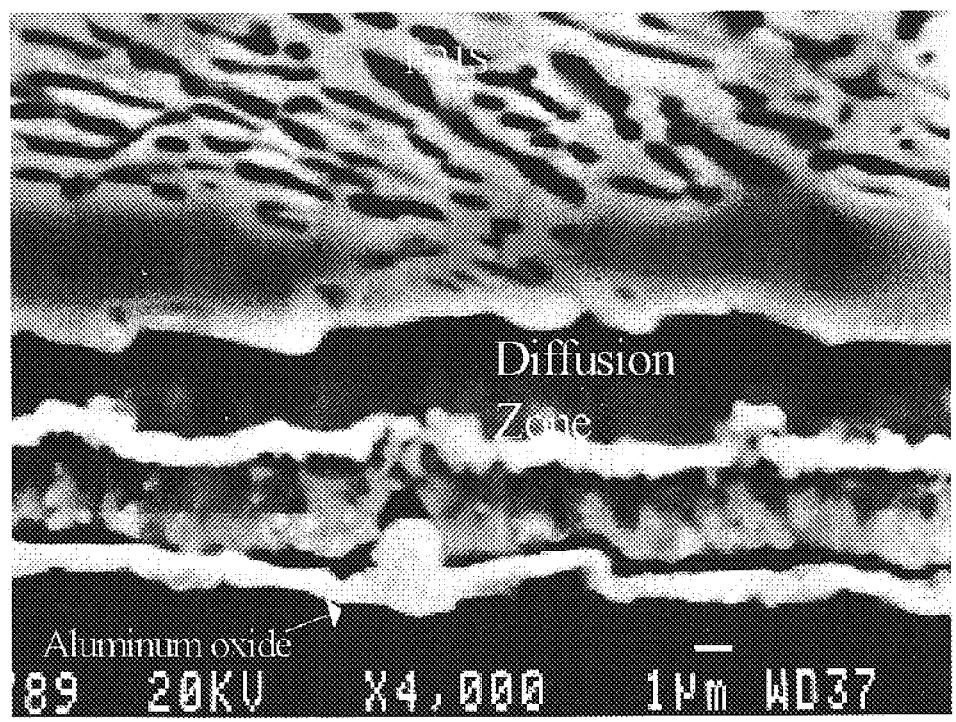
FIG. 3 illustrates a titanium aluminide protective coating.

The resulting surface structure of the titanium metal component is illustrated in FIG. 3. The diffusion of aluminum and transformation of titanium to titanium aluminide preferably occurs at temperatures around 700° C. A conversion layer having thickness in the range of 0.5–40 microns could produce a titanium aluminide coating having a thickness between 1 and 80 microns.

After the low temperature heating, a surface layer of alumina remains on the titanium aluminide. The alumina surface layer also provides oxidation protection. The thickness of the alumina surface layer may be between 0.5 microns and 5 microns.

Correct heat treatment of the protective coating results in an oxidation resistant coating that protects the titanium from oxidation and embrittlement even after exposure for 4,000 hours up to 800° C. This is illustrated in Table 1, which indicates mechanical properties of coated titanium alloy Ti21S, and a simple alloy Ti 3-2.5, which is highly prone to oxidation. Foil of seven mil thick was used. This foil is more prone to oxidation than large heat exchanger sections due to its very high surface area to volume ratio.

TABLE 1

Mechanical Properties of Ti21S & Ti3–2.5 7 mil foil after exposure to high temperatures and the associated weight gain due to oxidation

| Alloy + Coating | Temp. [° C.] | Time [hrs] | YS [ksi] | UTS [ksi] | Elongation [%] | Weight Gain [μg/cm²] |
|---|---|---|---|---|---|---|
| Ti3–2.5 + Al | 700 | 4,000 | 41 | 86 | 14 | — |
| Ti3–2.5 + Al | 700 | 4,000 | 65 | 83 | 17 | — |

TABLE 1-continued

Mechanical Properties of Ti21S & Ti3–2.5 7 mil foil after exposure to high temperatures and the associated weight gain due to oxidation

| Alloy + Coating | Temp. [° C.] | Time [hrs] | YS [ksi] | UTS [ksi] | Elongation [%] | Weight Gain [μg/cm²] |
|---|---|---|---|---|---|---|
| Ti21S + Al | 700 | 4,000 | 115 | 121 | 4 | — |
| Ti21S + Al | 700 | 4,000 | 117 | 118 | 5 | — |
| Ti21S | 700 | 192 | 70 | 75 | 0.5 | 1160 |
| Ti21S + Al | 700 | 192 | 117 | 130 | 10.7 | 50 |
| Ti21S | 760 | 192 | — | 75 | ~0.0 | 2600 |
| Ti21S + Al | 760 | 192 | 109 | 111 | 13.6 | 100 |

Table 1 shows the mechanical properties of aluminum-coated Ti21S after exposure to about 700° C. and 760° C. for 192 hours and 4000 hours.

Because the preferred gaseous deposition technique is performed at low temperatures, it has several advantages over conventional techniques such as PVD, CVD and in-the-pack and above-the-pack techniques. The conventional techniques involve temperatures (typically about 1,000° C.) that would destroy the mechanical properties of the titanium due to grain growth or over-aging, depending on the temperature and alloy The conventional techniques would also open up the possibility of oxidation of unprotected titanium, even if the process occurs in a vacuum. In addition, conventional techniques involve temperatures above or close to that of the melt temperature of titanium brazes (typically about 900° C.). Erosion is a common problem with titanium; it is indicative of too high a braze temperature or too long a time at high temperatures. Even temperatures of about 800° C. could lead to a non-optimum coating and result in erosion and metallurgical problems due to excessive diffusion. In addition, excessive distortion of the complex shape of the heat exchanger would occur, with leaks forming between passages.

Deposition of the aluminum at too high a temperature prevents the formation of the surface alumina layer. Deposition at the elevated temperature results in the diffusion of the aluminum into the titanium during the coating process so afterwards there is no aluminum to oxidize to alumina. Hence, protection would only be provided by titanium aluminide and not by the titanium aluminide and alumina layer. For the braze clad material, dissolution of the aluminum into the braze would be complete and an oxidation protection barrier would not be formed.

The heat treatment temperatures determine the type of titanium aluminides formed and the degree of diffusion of the aluminum into the titanium. The gaseous coating and heat treating steps can be separated to give better control of microstructure and the formation of the alumina layer, unlike conventional processes (in-the-pack and above-the pack processes) that combine the coating and heat treating steps.

Even exposure of aluminum-coated titanium to these high temperatures results in the dissolution of the aluminum plus the formation of undesirable titanium aluminides as Table 2 shows. The titanium alloy Ti21S coated with a thin 10 micron aluminum layer was heat treated over a wide temperature range to illustrate the different aluminides that can be formed. At the higher temperatures, the phases are titanium-rich as the aluminum diffuses into the center of the component. The amount of alumina ($Al_2O_3$) decreased by over a factor of five, going from a major constituent to minor as the heat treatment temperature increases. Both of these effects would be expected to reduce oxidation resistance.

Figure 4:
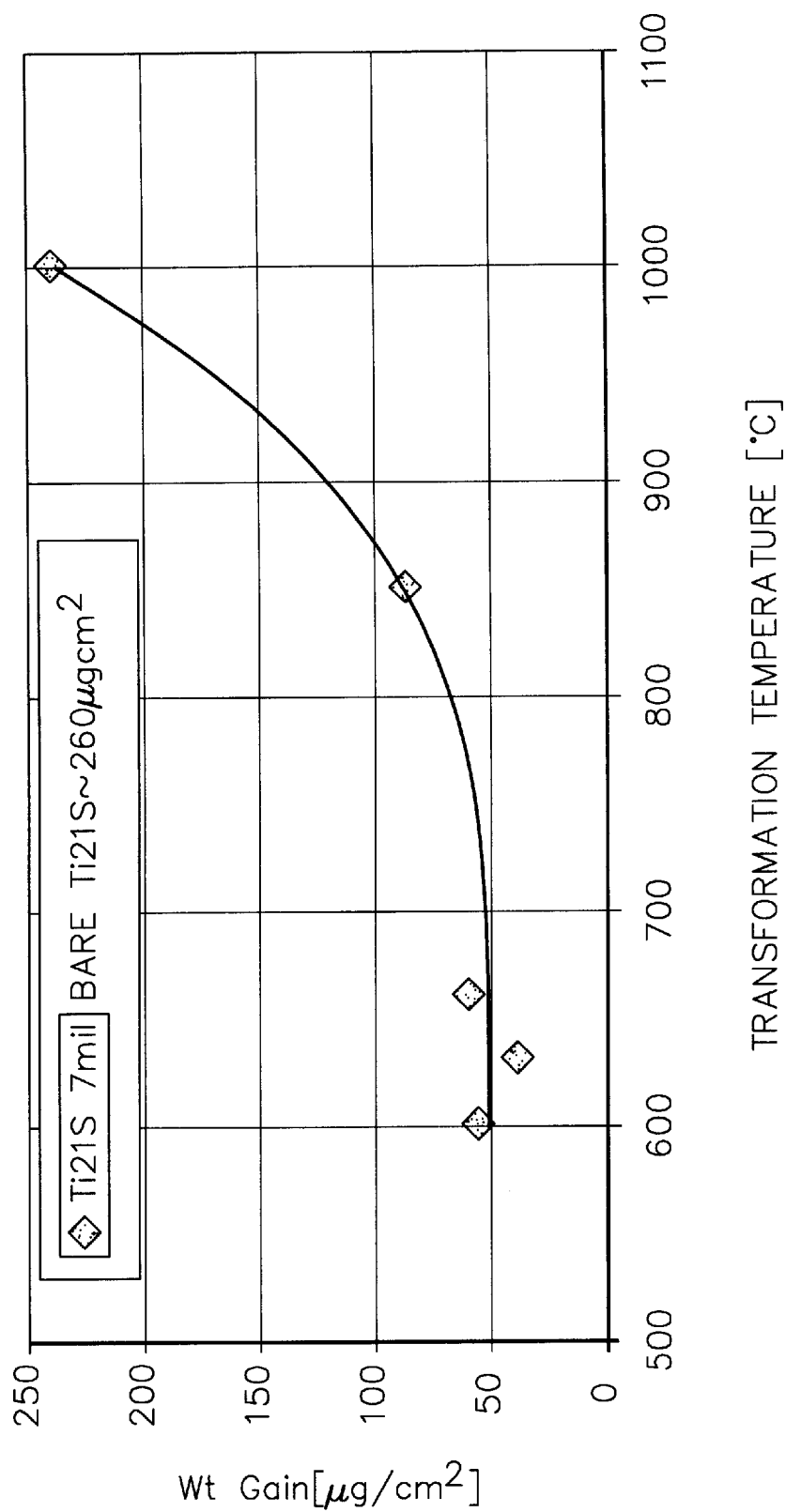
FIG. 4 Illustrates the importance of the transformation temperature on the oxidation resistance of the coating.

FIG. 4 shows that the weight gain after exposure to 600° C. for 192 hrs is the same for the material heat treated at 1,000° C. as for bare material (see box insert) with no protection. While heat treating at 700° C. results in a low weight gain.

TABLE 2

Comparison of Titanium Aluminide Phases formed and Wt. % of $Al_2O_3$ Vs. Heat Treating Temperature

| Temperature [° C.] | Titanium aluminide phases | Approx. wt % of $Al_2O_3$ |
|---|---|---|
| 700 | $Al_3Ti$ trace Ti | 1 |
| 850 | $Al_3Ti$, $Al_2Ti$, AlTi & $AlTi_2$ | 0.5 |
| 1,000 | $AlTi_3$, trace $Al_2Ti4C_2$, & $Al_5Ti_2$ | 0.2 |

Figure 2B:
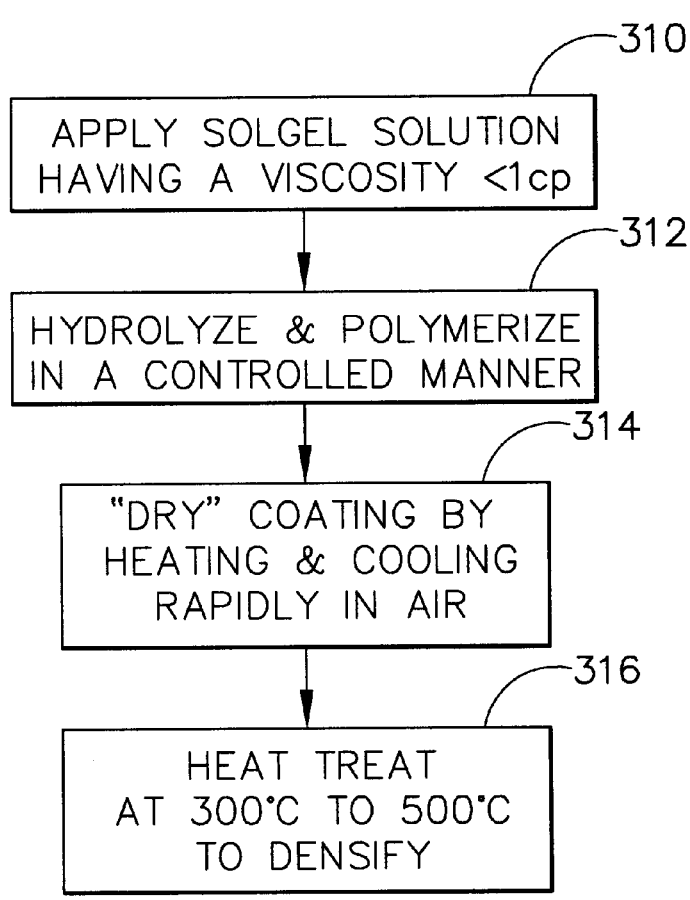
FIG. 2b is an illustration of a second method of applying a protective coating to the titanium heat exchanger.

Referring to FIG. 2b, an exemplary method of creating a solgel dip coating will now be described. The solgel dip coating can be applied directly to the titanium or titanium aluminide surface of the heat exchanger by a paintbrush, by spraying or by dip depositing (310). Preferably, the heat exchanger is dipped in a solgel solution for a time period just sufficient to ensure wetting of all the surfaces and removal of any entrapped air. Viscosity of the solgel solution is less than 1 centipoise; otherwise the solution may not enter all the passages of the heat exchanger and will block the passages that it does enter. The low viscosity of less than 1 centipoise also allows for a uniform coating thickness, which reduces cracking of the coating. Withdrawing the heat exchanger at a controlled, predetermined rate also allows for a uniform coating thickness. Increasing the rate will increase the coating thickness. A rate of around 150 mm per min has been found to be satisfactory.

The solgel coating is formed by a reaction of the solgel solution with water usually in the form of moisture in the atmosphere. These reactions occur at room temperature. The coating on the heat exchanger is hydrolyzed and subsequently polymerized in a controlled humidity environment (312).

The coating may be rapidly heated and cooled in an air furnace during application (314). The heating and cooling allow the solgel to be formed in less than an hour (as opposed to one day, which is typical). For example, the solgel coating may be fired by placing it directly in a pre-heated furnace and removed after a roughly 30 min hold. The low temperatures avoid the use of a vacuum furnace for each "drying" step and thereby significantly reduce the cost of applying the solgel protective coating.

The solgel coating is heat treated at low temperatures (316). The heat treatment densities the coating so that it provides a barrier to oxidation. Low temperatures of about 300° C. to 500° C. avoid oxidation of the uncoated titanium. Temperatures over 700° C., in contrast, would oxidize the titanium, rendering the heat exchanger brittle and unusable. These high temperatures will result in grain growth and will also overage titanium alloys. They will also result in distortion of the complex shape of the heat exchanger and leakage between passageways 13 and 14.

The solgel coating is preferably applied through multiple dips. For example, the solgel coating may be applied in three dips wherein the coatings of the first and second dips are fired (that is, dried) at a low temperature of 300° C. to 500° C. (a temperature at which the titanium has minimum or no oxidization) for a 30 minute time period; and the third dip is fired in air or a protective atmosphere at 350° C. to 600° C. for a 30 minute time period with no oxidation of the titanium. This rapid firing in air is a marked advantage over the typical 700° C. to 800° C. firing. It makes the process less expensive and more viable because it avoids the use of a vacuum furnace that would be required for the conventional process and reduces time compared to the conventional process.

Solgel coatings include alumina, zirconia, titanium oxide and silica. These solgel coatings can be readily applied directly to the titanium alloy, the braze or to the titanium aluminide coating to provide oxidation protection. The zirconia and alumina coatings have the advantage of the rapid firing cycle at a low temperature of 350° C. to 600° C. Alumina has the advantage of a higher thermal conductivity than zirconia.

These solgel coatings also provide oxidation protection and allow high strength and ductility to be retained in the titanium. This is true even for a 4 mil thick foil of Ti 3-2.5, an alloy very prone to oxidation, after exposure to 600° C. for 192 hrs. See Table 3.

TABLE 3

Mechanical Properties of Zirconia Solgel Coated Ti3–2.5 After Exposure to 600° C. for 192 Hours

| Zirconia solgel | YS [ksi] | UTS [ksi] | El [%] |
|---|---|---|---|
| Ti3–2.5 | 80 | 103 | 8 |

The titanium aluminide and solgel coatings may be applied to structures other than heat exchangers. For instance, the coatings may be applied to exhaust manifolds on internal combustion engines and gas turbine engines, titanium impellers, etc.

Although the present invention has been described above with reference to specific embodiments, it is not so limited. Instead, the present invention is construed according to the claims that follow.

What is claimed is:

1. A heat exchanger comprising:
 a core including titanium-based components that are bonded together by braze; and
 a protective coating on bare metal and braze surfaces of the core, the coating including a titanium aluminide conversion layer and an alumina top layer, the conversion layer having a thickness of at least 0.5 microns.

2. The heat exchanger of claim 1, wherein the titanium-based components are made of metal selected from the group consisting of CP Ti, Ti 3-2.5, Ti 1100, Ti 15-3, Ti21 S, Ti 6242, and IMI 834.

3. The heat exchanger of claim 1, wherein the braze surfaces cover a substantial portion of the core.

4. The heat exchanger of claim 1, further comprising a solgel coating on the protective coating.

5. The heat exchanger of claim 1, further comprising titanium manifolds connected to the core, the manifolds also coated with the protective coating.

6. A method of fabricating the heat exchanger of claim 1, the method comprising:
 forming the titanium heat exchanger core; and
 applying the protective coating to bare titanium and braze surfaces of the core by applying an aluminum conversion layer to the core at a temperature below which aluminum does not appreciably react with titanium, and then heat treating the conversion layer so the aluminum oxidizes and interacts with the titanium to form the titanium aluminide conversion layer.

7. The method of claim 6, wherein the aluminum conversion layer is transformed to titanium aluminide by heating at a slow controlled rate above about 500° C. followed by a short hold at a temperature no more than 750° C., and cooling at a controlled slow rate back down to about 500° C.

8. The method of claim 6, wherein the conversion layer is applied by gaseous deposition.

9. The method of claim 8, wherein the gaseous deposition and heat treating are performed separately.

10. The method of claim 6, wherein the conversion layer is applied at temperatures below 300° C.

11. The method of claim 6, wherein the conversion layer is oxidized to form an alumina surface layer.

12. The method of claim 6, further comprising securing manifolds to the core and applying the protective coating to the manifolds.

13. The method of claim 6, further comprising applying an outer solgel coating.

* * * * *